United States Patent [19]

Murasaki

[11] Patent Number: 5,342,569

[45] Date of Patent: Aug. 30, 1994

[54] METHOD OF ATTACHING A FASTENING TAPE TO A MOLDED ARTICLE

[75] Inventor: Ryuichi Murasaki, Toyama, Japan

[73] Assignee: Yoshida Kogyo K.K., Tokyo, Japan

[21] Appl. No.: 29,536

[22] Filed: Mar. 11, 1993

[30] Foreign Application Priority Data

Mar. 23, 1992 [JP] Japan .................................. 4-064706

[51] Int. Cl.⁵ .............................................. B29C 39/00
[52] U.S. Cl. ............................... 264/259; 264/46.4; 264/276; 264/278
[58] Field of Search ...................... 264/46.4, 46.7, 259, 264/267, 276, 278

[56] References Cited

U.S. PATENT DOCUMENTS

| | | | |
|---|---|---|---|
| 4,673,542 | 6/1987 | Wigner et al. | 264/46.7 |
| 4,693,921 | 9/1987 | Billarant et al. | 264/46.7 |
| 4,696,776 | 9/1987 | Hooker et al. | 264/46.7 |
| 4,710,414 | 12/1987 | Northrup et al. | 264/46.7 |
| 4,802,939 | 2/1989 | Billarant et al. | 264/46.7 |
| 4,814,036 | 3/1989 | Hatch | 264/46.7 |
| 4,881,997 | 11/1989 | Hatch | 264/46.7 |
| 4,933,035 | 6/1990 | Billarant et al. | 264/46.7 |

FOREIGN PATENT DOCUMENTS

| | | |
|---|---|---|
| 0116357 | 8/1984 | European Pat. Off. . |
| 0145523 | 6/1985 | European Pat. Off. . |
| 0168240 | 1/1986 | European Pat. Off. . |
| 0439969 | 8/1991 | European Pat. Off. . |
| 59-63735 | 4/1984 | Japan . |
| 62-102793 | 5/1987 | Japan . |
| -318816 | 3/1991 | Japan . |
| 360291 | 9/1991 | Japan . |
| WO9111326 | 8/1991 | PCT Int'l Appl. . |

Primary Examiner—Allan R. Kuhns
Attorney, Agent, or Firm—Hill, Steadman & Simpson

[57] ABSTRACT

A method is disclosed for attaching a fastening tape to a molded article and also a mold is disclosed for forming a cellular plastic or foam product for use as a cushioning material for an automobile seat or backrest.

The fastening tape is typically in the form of a velcro-like or surface-type fastener carrying on one side thereof a multiplicity of hooks and on the other side a plurality of anchoring members to anchor a molding materials M in the mold. A flexible sealing flange is formed on the tape for protecting the hooks against leakage therein of the molding material during the molding operation in which cooperating halves of the mold are closed with pressure-applying means engaged with and urging the tape against a flexible bottom wall of the cavity mold.

2 Claims, 8 Drawing Sheets

METHOD OF ATTACHING A FASTENING TAPE TO A MOLDED ARTICLE

BACKGROUND OF THE INVENTION

1. Field of the Invention

This invention relates to a method of attaching a fastening tape to a molded article and a mold for forming a cellular plastic or foam product for use as a cushioning material for an automobile seat or backrest.

2. Prior Art

It has thus far been proposed to use a fastening tape generally known as a velcro-like or surface-type fastener for attachment to a foam-molded article such as a seat cushion, the fastening tape having on its one side a gripping means typically embodied in the form of a multiplicity of hooks designed to engage with complimentary gripping means typically in the form of loops or eyes provided on an article such as a seat cover. The fastening tape is attached to such a foam-molded article during the molding of the latter as is known in the art.

Such tape attachment is disclosed in Japanese Patent Publication No. 3-18816 in which there is used a mold having a main cavity for receiving the hook-carrying face of a fastening tape and on each side of this main cavity, two small lateral cavities or grooves adhesively coated for holding the longitudinal marginal areas of the tape in place during the molding operation, the tape having on its back side a plurality of anchoring elements protruding into and anchoring a molding material in the mold cavities.

A similar means of attaching a fastening tape to a foam-molded article such as a seat cushion is disclosed in Japanese Patent Publication No. 3-60291 in which the tape is protected with a thin film disposed over its hook-carrying surface during molding and held in place, before and during molding, relative to the mold by a magnetic means, the tape having its longitudinal marginal areas adhesively fixed within the small cavities on opposite sides of the main cavity.

Japanese Laid-Open Patent Publication No. 62-102793 features the use of a base made of or associated with a resilient material received resiliently within the mold cavity and an attachment web of fabric carrying loops for engagement with complimentary hooks on a fastening tape, the base, web and tape being interconnected in this order with the hook-carrying face of the tape exposed to view.

The above prior art techniques have their respective approaches for protecting the fastening tape against penetration thereinto of a molding material before and during the molding process as by means of a protective film, a magnetic device and a resilient base extension, respectively.

These prior art devices have a drawback in that they are costly and complicated in the operation of attaching the fastening tape to a molded article.

Another common drawback is that the fastening tape is restricted in its dimension and location as these parameters are governed by the physical characteristics of the mold cavity in which the tape is received during the molding

SUMMARY OF THE INVENTION

It is therefore a primary object of the present invention to provide a method of attaching a fastening tape having a male or hook gripping element to a molded article such as a seat cushion, which method is simple and less costly and which is also capable of attaching fastening tapes of different dimensions at different locations with respect to a molded article.

Another object of the invention is to provide a fastening tape having a gripping element to be attached to a foam-molded article, which tape is provided with a means of protecting the tape, the gripping element thereof inter alia, against entry or penetration thereinto of a molding material during the molding operation.

A further object of the invention is to provide a mold for foam-molding an article such as a seat or backrest cushion to which a fastening tape is attached during the molding process, which mold is provided with a pressure-applying means of holding a fastening tape of the type above mentioned in hermetically sealed engagement with a cavity wall of the mold thereby preventing the penetration of a molding material into the face of the tape which carries the gripping element.

The above and other objects of the invention will be better understood from reading the following detailed description with reference to the accompanying drawings which illustrate by way of example some preferred embodiments.

According to one aspect of the invention, there is provided a method of attaching a fastening tape to an article to be molded in a mold comprising a core mold and a cavity mold having a flat bottom wall, the tape having a gripping element on one side and an anchoring element on the other side, which method comprises the steps of: positioning the tape in the mold at selected locations with said one side facing toward the bottom wall; applying a pressure to the tape with said one side held flat against said bottom wall to form a liquid-tight seal therebetween; closing the mold and filling the same with a molding material M in liquid phase to be anchored by the anchoring element; curing the molding material M; and removing the molded article from the mold with the gripping element exposed to view.

According to another aspect of the invention, there is provided a mold for molding an article attached with a fastening tape having an anchoring element on one side and a flexible sealing flange on the other side defining a chamber in which a gripping element is accommodated, which mold comprises a composite mold formed of a cavity mold having a cavity defined by outwardly diverging curved side walls and a substantially flat bottom wall and a core mold having pressure-applying means for applying a pressure to the tape such that the sealing flange is held flat against the bottom wall of the cavity mold to seal the chamber liquid-tight against leakage thereinto of a molding material M.

According to a further aspect of the invention, there is provided a mold for molding an article attached with a fastening tape having an anchoring element on one side and a flexible sealing flange on the other side defining a chamber in which a gripping element is accommodated, which mold comprises a composite mold formed of a cavity mold having a cavity defined by outwardly diverging curved side walls and a substantially flat bottom wall, a core mold having a plurality of through-holes and a pressure plate member releasably engageable with the core mold and having a plurality of pressure-applying means engageable through the through-holes with the tape and adapted to apply a pressure to the tape such that the sealing flange is held flat against the bottom wall of the cavity mold to seal the chamber liquid-tight against leakage thereinto of a molding material M.

DETAILED DESCRIPTION OF THE INVENTION

FIGS. 1 through 7 inclusive are utilized to illustrate a preferred method and apparatus according to the invention for attaching a fastening tape to a foam-molded article during the molding of the latter.

Figure 1:
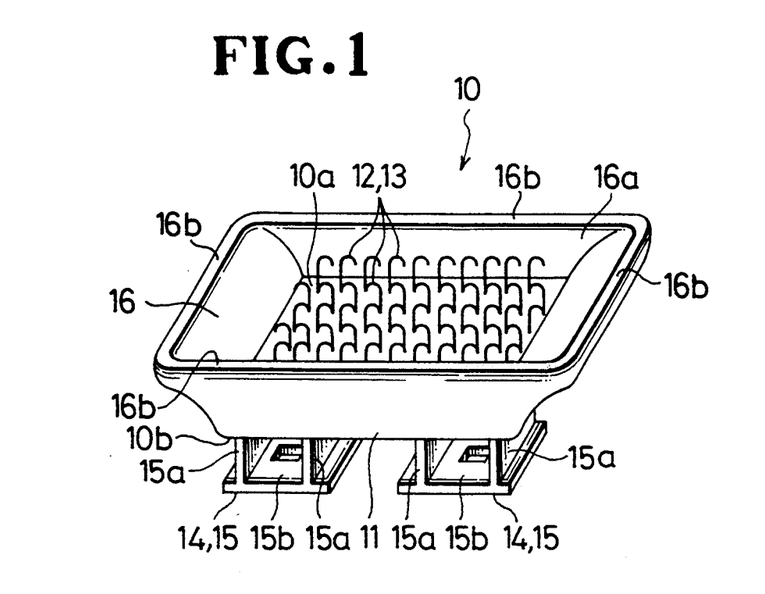
FIG. 1 is a diagrammatic perspective view of a fastening tape embodying the invention, the tape being shown with its gripping side up.

Referring first to FIG. 1, there is shown a fastening tape 10 of a woven or knitted structure which comprises a generally flat square web or base 11 carrying on one of its surfaces or sides 10a a gripping element 12 in the form of a multiplicity of hooks 13 for gripping engagement with complimentary loops on an article to be molded such as a seat cover (not shown), and on the opposite surface or side 10b an anchoring element 14 in the form of a plurality (four as presently illustrated) of rectangular hollow stool-like members 15 for anchoring a molding material (FIGS. 5 and 6), each having spaced side portions 15a defining therebetween a through-opening 15b to be filled with the molding material. A flexible sealing flange 16 extends integrally peripherally from the four sides of the base 11 in surrounding relation to the hooks 13 and is flared in a direction facing toward a mold cavity (FIGS. 5 and 6) thereby forming an open chamber 16a with all of its four peripheral edges 16b being substantially flat and flush for purposes hereinafter to be described.

Figure 2:
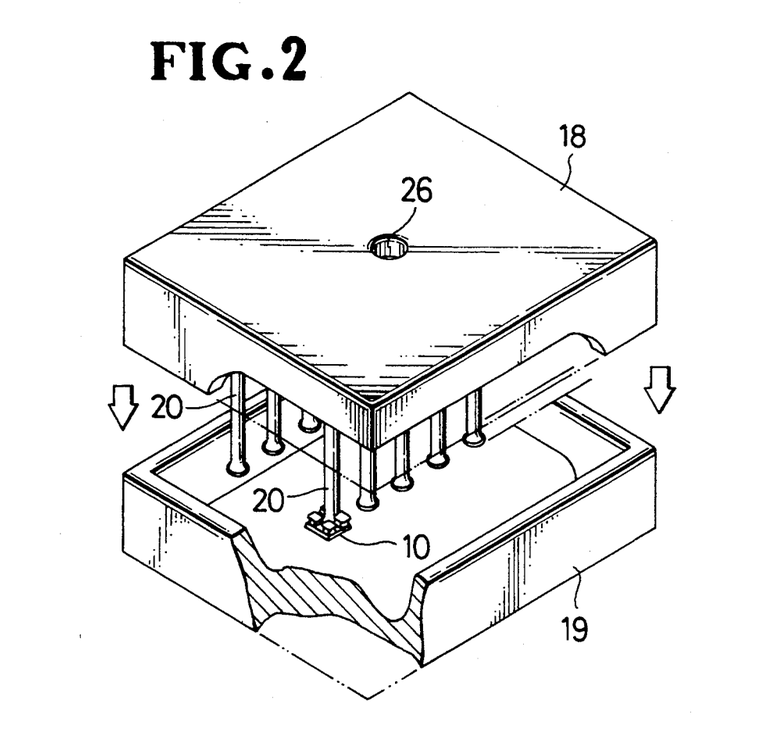
FIG. 2 is a diagrammatic perspective view of one form of a mold embodying the invention.
Figure 3:
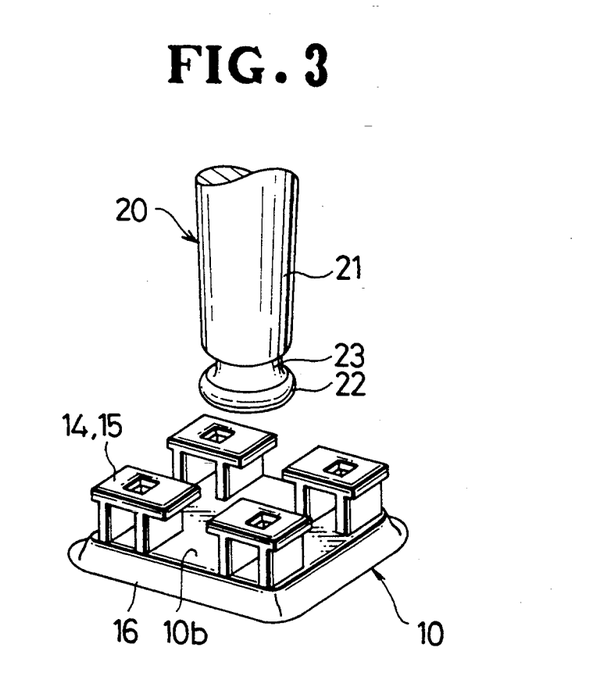
FIG. 3 is a diagrammatic perspective view of the tape of FIG. 1, but with its opposite or anchoring side up facing toward one form of pressure-applying means extending from the mold.
Figure 4:
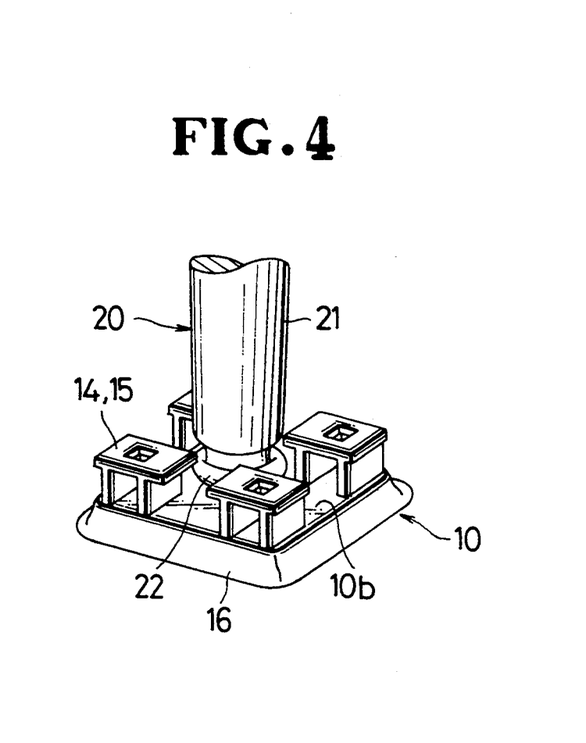
FIG. 4 is a view similar to FIG. 3 but showing the pressure-applying means fully engaged with the anchoring side of the tape.

A preferred form of mold 17 embodying the invention as better shown is a composite mold of a generally rectangular box-like configuration comprised of cooperating mold halves, which are separably interengageable, one of which is referred to herein as a core mold 18 and the other as a cavity mold 19.

The core mold 18 is provided with a plurality of aligned rows of pressure pins 20 constituting what is termed "pressure-applying means" hereunder, the pins 20 extending downwardly toward the cavity mold 19 and being spaced one from another by a predetermined distance such that individual pins 20 each register in position with corresponding fastening tapes 10 in the cavity mold 19. Each of the pressure pins 20 has a cross-sectionally round body 21 with an annular ring or disc 22 connected thereto by a reduced neck portion 23 at its free end, the ring 22 having a diameter corresponding to or slightly larger than a space jointly defined by the four anchoring members 15 such that the ring 22 fits snappingly therebetween as better shown in FIG. 4.

Figure 5:
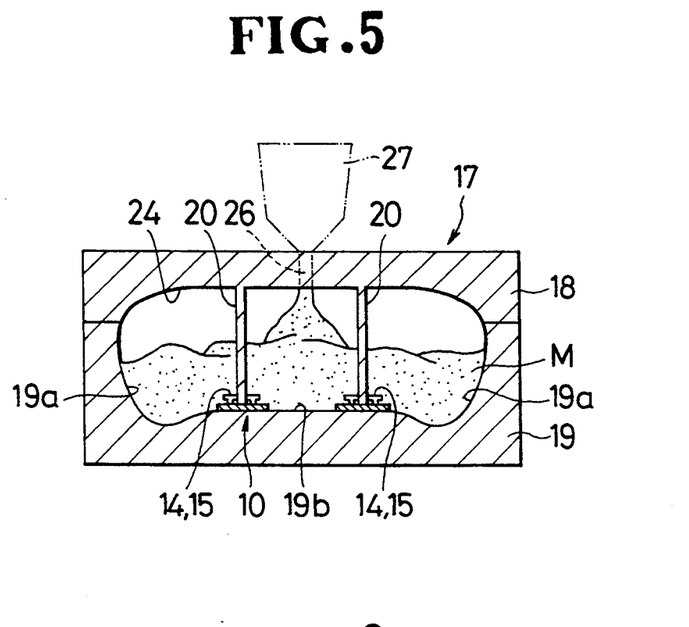
FIG. 5 is a transverse cross-sectional view of the mold shown closed.

The core mold 18 and the cavity mold 19 have their respective cavities 24 and 25 which mate with each other to establish a continuity of one integral cavity when the two molds 18 and 19 are fully closed together as shown in FIG. 5. The cavity 25 of the cavity mold 19 is defined by outwardly diverging curved side walls 19a and a substantially flat bottom wall 19b of the mold 19, the bottom wall 19b serving as an abutment against which the fastening tape 10 is held during the molding process.

Designated at 26 is a feed inlet formed centrally in the core mold 18 for charging therethrough a molding material M such as polyurethane into the cavities 24 and 25.

The bottom wall 19b of the cavity mold 19 is finished preferably as flat and smooth as possible to ensure an effective hermetic seal with the gripping side 10a of the tape 10 by a so-called "sucking action" in which the pressure within the chamber 16a of the tape 16 is reduced upon pressure contact with the pressure pin 20, causing the sealing flange 16 to stick along its peripheral edges 16b onto the bottom wall 19b of the cavity wall 19 thereby preventing penetration into the chamber 16a of the molding material M which would otherwise physically destroy the function of the gripping element 12, i.e., hooks 13.

According to the method of the invention, the fastening tape 10 is positioned in the mold 17 with its gripping side 10a held flat against the bottom wall 19b of the cavity mold 19, followed by closing the core mold 18 upon the cavity mold 19, when the pressure pin 20 on the core mold 18 is brought into pressure engagement with the tape 10 with the annular ring 22 of the pin 20 slipped in between the anchoring members 15 on the anchoring side 10b of the tape 10. In this instance, it goes without saying that there may be placed in the mold 17 as many individual fastening tapes 10 as desired depending upon the number of the pressure pins 20 in the core mold 18.

Figure 6:
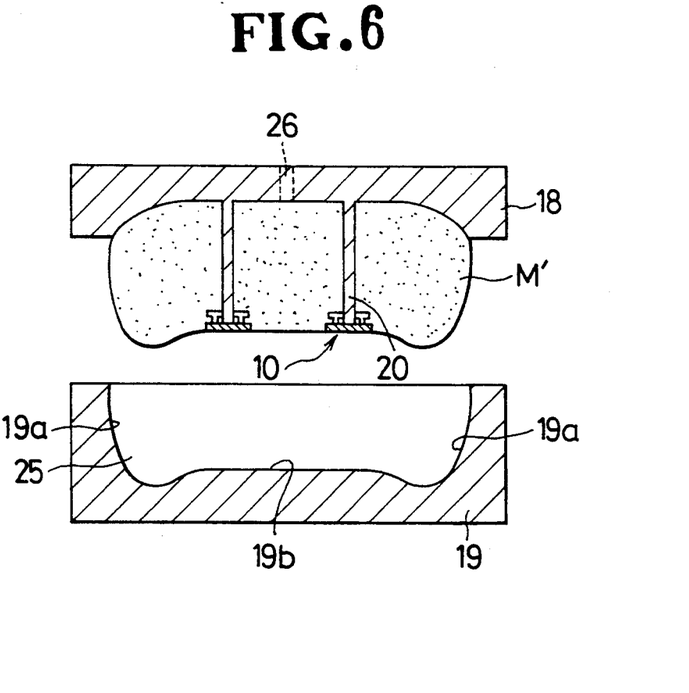
FIG. 6 is a transverse cross-sectional view of the mold shown opened.

With the tape or tapes 10 thus set in position with the mold 17, the molding material M in liquid phase is charged from a feed means 27 until the cavity 24, 25 of the closed mold 17 is substantially filled up as shown in FIG. 5, in which instance the molding material M is anchored by the anchoring element 14 (stool-like members 15) of the fastening tape 10, but is prevented from penetrating or leaking into the chamber 16a of the tape 10 in which the gripping element 12 (hooks 13) is accommodated, because the chamber 16a is sealed with the sealing flange 16 hermetically engaged with the flat bottom wall 19b of the cavity mold 19, forming a liquid-tight seal therebetween by the sucking action. After the molding material M is cured in a manner well known in the art, the mold 17 is opened by lifting the core mold 18 together with the molded article M' apart from the cavity mold 19 as shown in FIG. 6 and thereafter the molded article M' is released or detached from the core mold 18 by drawing the pressure pins 20 out of the article M' to produce a finished foam-molded article M" such as an automobile seat cushion (FIG. 7) having the fastening tape 10 with the gripping hooks 13 exposed to view which are to be engaged with complimentary loops on a mating article such as a seat cover (not shown).

Figures 7, 8:
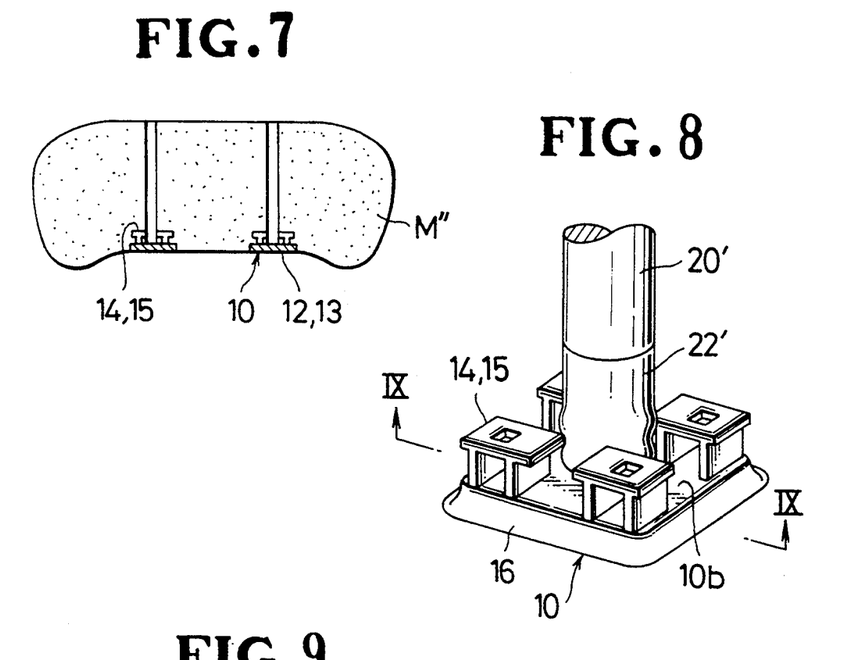
FIG. 7 is a transverse cross-sectional view of a foam-molded cushion product.
FIG. 8 is a view similar to FIG. 4 but showing a different form of pressure-applying means.
Figure 9:
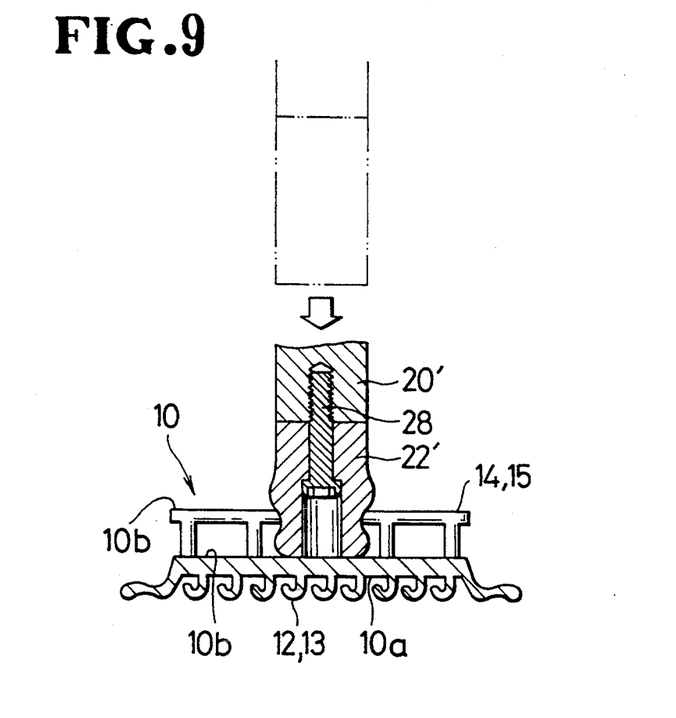
FIG. 9 is a cross-sectional view taken on the line IX—IX of FIG. 8.

FIGS. 8 and 9 illustrate a modified form of pressure-applying means 20' in which there is provided an engaging member 22' in place of the ring 22, the engaging member 22' connected to a free end of the pin body 21 by means of a threaded bolt 28. The engaging member 22' is formed from polyurethane or like elastically deformable material such that it can resiliently engage with the anchoring element 14.

Figure 10:
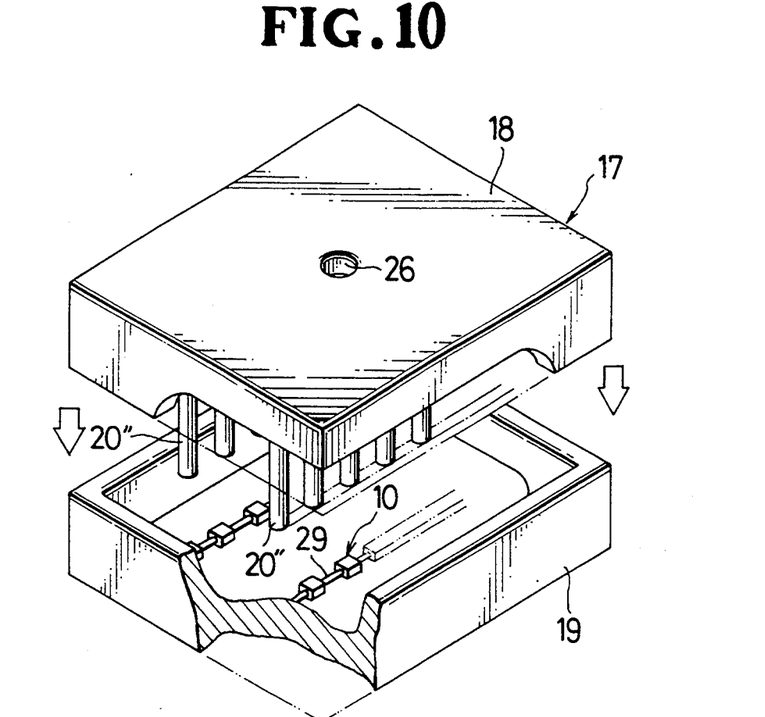
FIG. 10 is a perspective view of another form of a mold employed in accordance with the invention.
Figure 11:
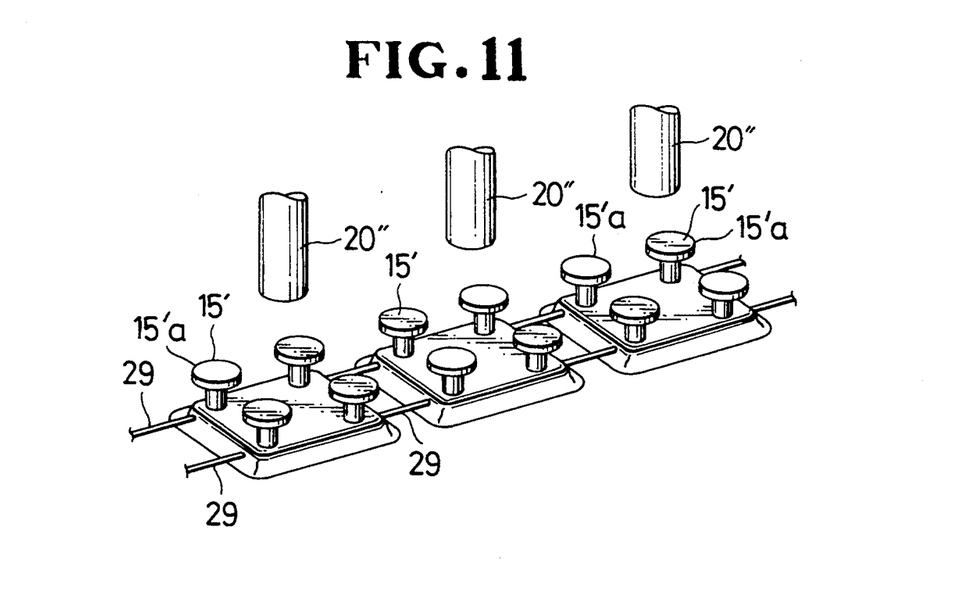
FIG. 11 is a perspective view of a plurality of serially interconnected fastening tapes with their respective anchoring sides facing toward corresponding pressure-applying means.

FIGS. 10 and 11 illustrate another modified form of pressure-applying means 20" and a modified form of anchoring element 14'. The pressure pin 20" is uniform in diameter throughout its length and devoid of the ring 22 or the engaging member 22'. It is designed to press directly against the anchoring side face 10b of the tape 10 without contact with the anchoring members 15' each having a rounded head 15'a, for which purpose the anchoring members 15' are spaced apart a distance sufficient to provide a clearance therebetween for the passage of the pin 20" and a row of individual tapes 10 are interconnected by connecting threads 29.

Figure 12:
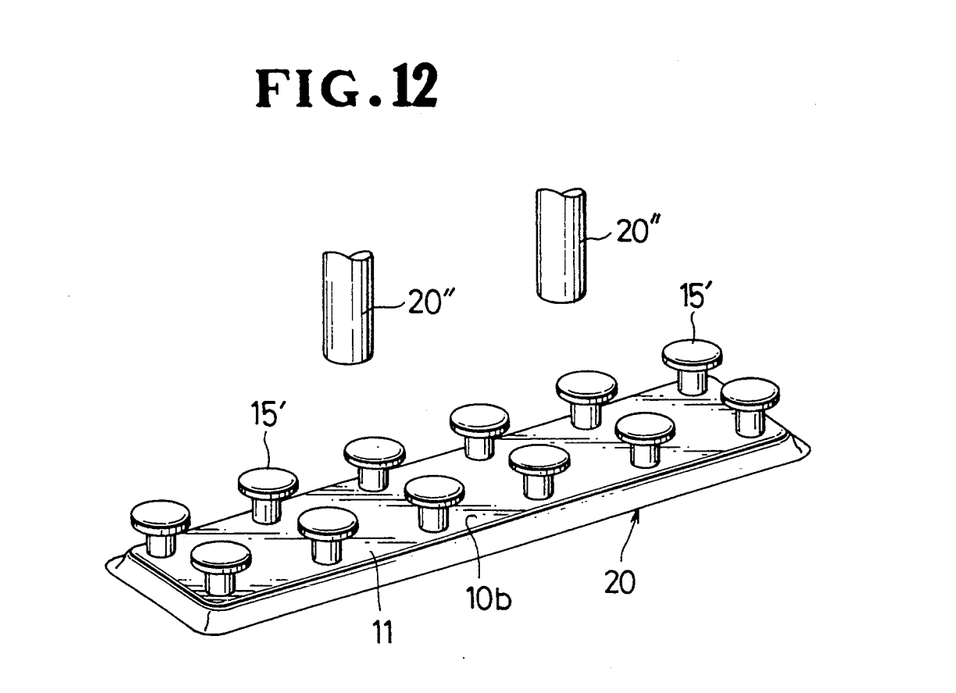
FIG. 12 is a perspective view of an elongated fastening tape with its anchoring side facing toward pressure-applying means.

FIG. 12 shows another modified form of fastening tape 10' which has an elongated base 11' carrying thereon an increased number of shaped anchoring members 15' without the use of connecting threads 29.

Figure 13:
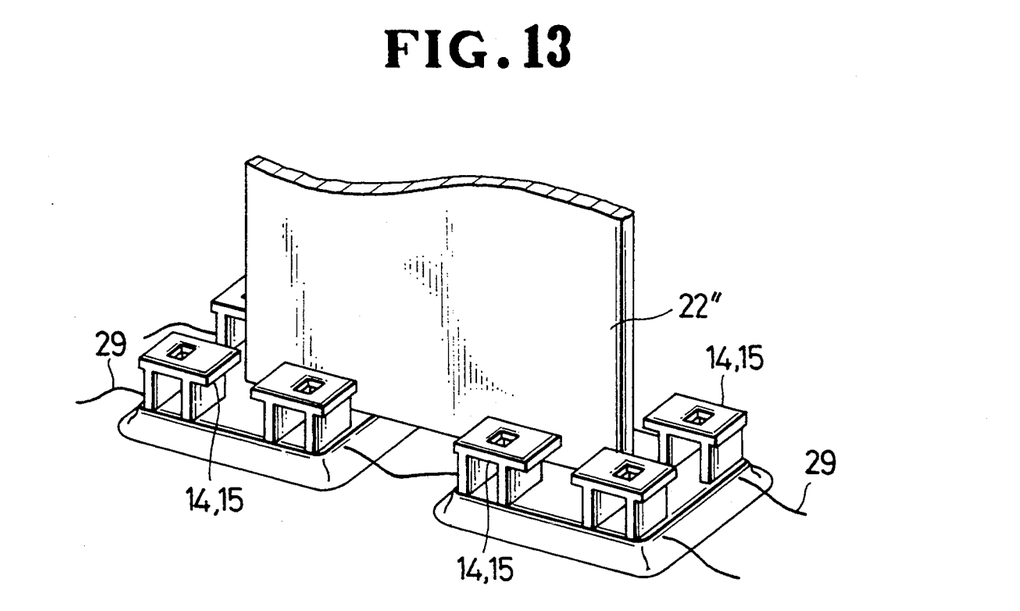
FIG. 13 is a perspective view of two interconnected fastening tapes of FIGS. 3 and 4 shown engaged with a still another form of pressure-applying means.
Figure 14:
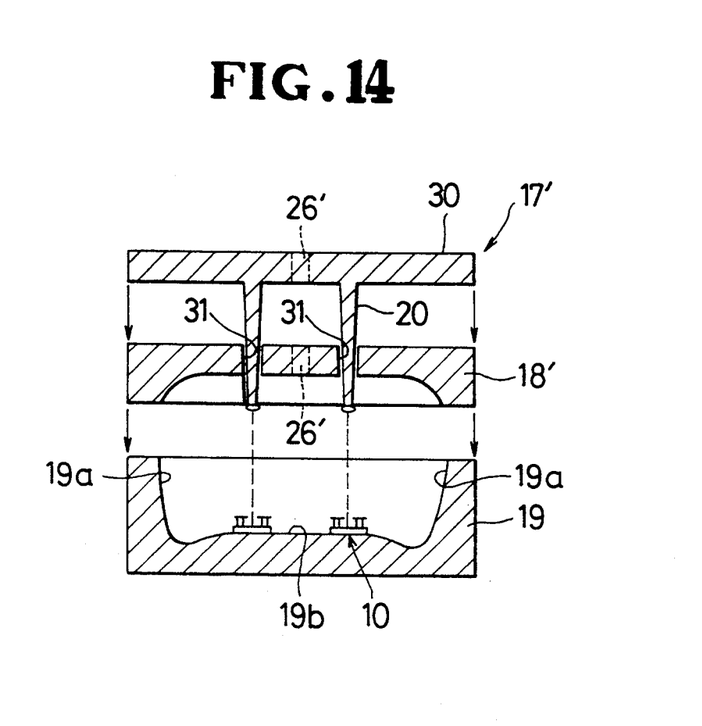
FIG. 14 is a cross-sectional view of a mold of a three-piece construction embodying the invention.

FIG. 13 shows a further modification in which the pressure-applying means comprises a plate member 22" in substitution for the pressure pins 20, 20', 20" which is designed with one of its side edges to position in between the anchoring members 22 and to press the tape 10 against the bottom wall 19b of the cavity mold 19.

FIGS. 14 through 17 inclusive show a modified form of mold 17' which is a three-piece construction comprising a core mold 18', a cavity mold 19 and a pressure plate member 30 releasably engageable with the core mold 18'. The pressure plate member 30 is provided centrally with a feed inlet 26 for introducing a molding material M and with spaced rows of pressure pins 20 extending downwardly for pressure engagement with the fastening tapes 10 in the manner already described. The core mold 18' is provided with a feed inlet 26' registrable with the inlet 26 of the plate member 30 and a plurality of through-holes 31 for receiving therethrough corresponding pressure pins 20 on the pressure plate member 30.

Figure 15:
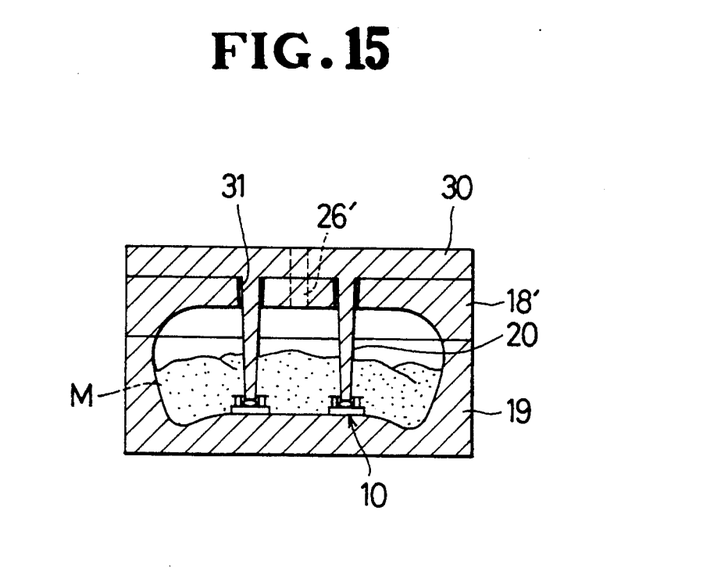
FIG. 15 is a cross-sectional view of the mold of FIG. 14 shown closed.
Figure 16:
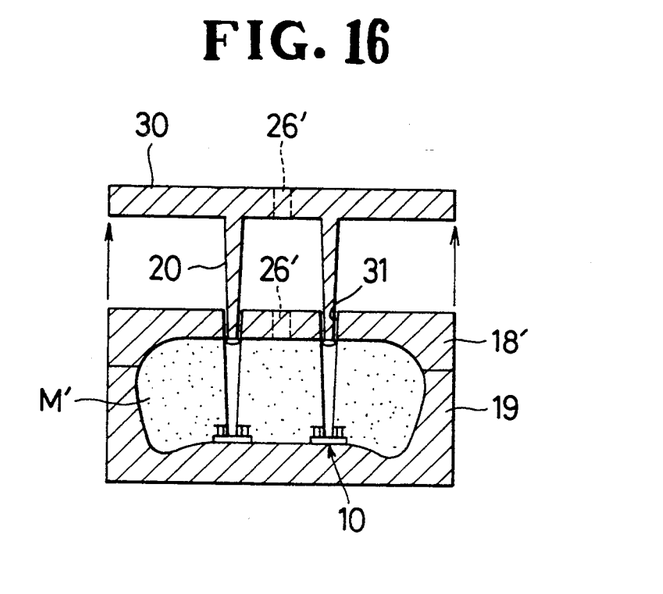
FIG. 16 is a view similar to FIG. 15 but showing the pressure-applying means lifted from the mold cavity.
Figure 17:
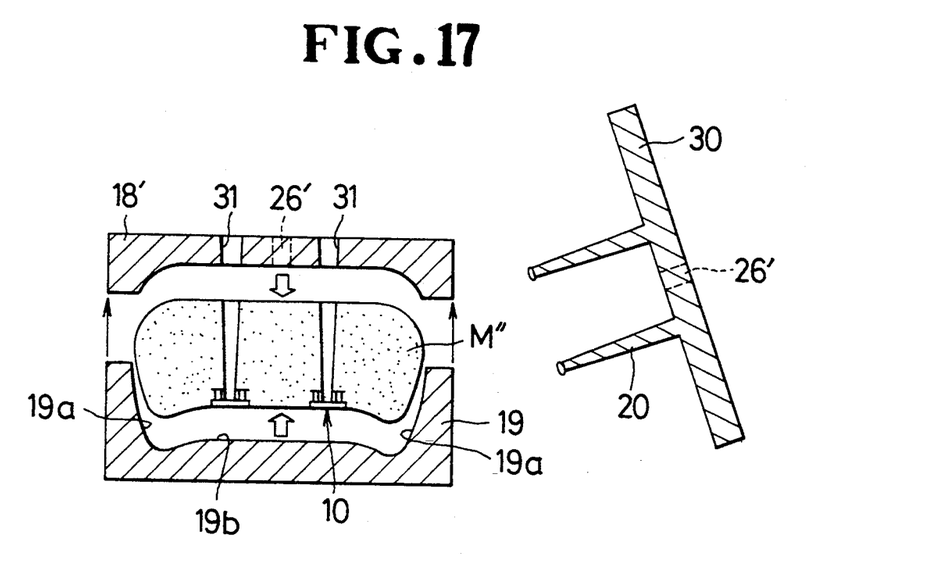
FIG. 17 is an exploded cross-sectional view of the mold shown in FIGS. 14–16.

The molding process is carried out with the three mold parts 18', 19 and 30 assembled together as shown in FIG. 15, and upon curing of the molding material M, the pressure plate member 30 is lifted apart from the core mold 18' with the pressure pins 20 simultaneously released from the molded article M' as shown in FIG. 16. The core mold 18' is thereafter separated from the cavity mold 19 to withdraw the finished article M" as shown in FIG. 17.

Obviously, various modifications and variations of the present invention are possible in light of the above teachings. It is therefore to be understood that within the scope of the appended claims the invention may be practiced otherwise than as specifically described.

What is claimed is:

1. A method of attaching a fastening tape to an article to be molded in a mold comprising a core mold and a cavity mold having a flat bottom wall, said tape having a gripping element on one side and an anchoring element on the other side, the method comprising the steps of:
   (i) positioning said tape in said mold at selected locations with the gripping element on said one side facing toward said bottom wall;
   (ii) applying pressure with a projection on the core mold to said tape with the gripping element on said one side held flat against said bottom wall to form a liquid-tight seal therebetween;
   (iii) closing said mold and filling the same with a molding material in a liquid phase to be anchored by said anchoring element;
   (iv) curing said molding material; and
   (v) removing the molded article from said mold with said gripping element exposed to view.

2. The method according to claim 1 wherein said fastening tape comprises a substantially flat base carrying on one side a gripping element in the form of a multiplicity of hooks and on the other side an anchoring element in the form of a plurality of anchoring members, and a flexible sealing flange extending integrally peripherally from said base in surrounding relation to said gripping element and being flared in a direction facing toward said cavity mold, said sealing flange having its marginal edge finished substantially flat and smooth.

* * * * *